(12) United States Patent
Kinoshita et al.

(10) Patent No.: US 8,132,845 B2
(45) Date of Patent: Mar. 13, 2012

(54) VEHICLE DOOR STRUCTURE

(75) Inventors: Kouji Kinoshita, Fujisawa (JP); Kikuo Onozaka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 62 days.

(21) Appl. No.: 12/515,359

(22) PCT Filed: Nov. 19, 2007

(86) PCT No.: PCT/JP2007/072399
§ 371 (c)(1),
(2), (4) Date: May 18, 2009

(87) PCT Pub. No.: WO2008/062759
PCT Pub. Date: May 29, 2008

(65) Prior Publication Data
US 2010/0019533 A1    Jan. 28, 2010

(30) Foreign Application Priority Data
Nov. 21, 2006    (JP) .................................. 2006-314735

(51) Int. Cl.
*B60J 5/04*    (2006.01)
(52) U.S. Cl. ..................... 296/146.6; 296/146.5; 49/502; 248/475.1
(58) Field of Classification Search ............... 296/146.6, 296/146.1, 146.5, 1.11; 248/466, 475.1, 248/479; 49/502
See application file for complete search history.

(56) References Cited

U.S. PATENT DOCUMENTS

| 4,322,132 | A | * | 3/1982 | Derr .............................. 359/844 |
| 5,857,731 | A | * | 1/1999 | Heim et al. ................ 296/146.2 |
| 6,302,473 | B1 | * | 10/2001 | Weber ........................ 296/146.6 |
| 2002/0162208 | A1 | * | 11/2002 | Wurm et al. .................... 29/430 |

FOREIGN PATENT DOCUMENTS

| DE | 195 19 509 A1 | 12/1995 |
| EP | 1 428 707 A1 | 6/2004 |
| FR | EP1 213 183 A1 * | 7/2001 |
| JP | 48-010348 Y | 3/1973 |
| JP | 07-251676 A | 10/1995 |
| JP | 2003-205741 A | 7/2003 |
| JP | 2005-280527 A | 10/2005 |

* cited by examiner

*Primary Examiner* — Glenn Dayoan
*Assistant Examiner* — Pinel Romain

(57) ABSTRACT

An outer door panel 2 defines a lower edge of a door window portion 8. An outer waist reinforcement 4 is disposed along the lower edge of the door window portion 8 on the inner side, in a vehicle-width direction, of the outer door panel 2, and fixed onto the inner side surface, in the vehicle-width direction, of the outer door panel 2. A door beam 5 is disposed in a front-rear direction below the outer waist reinforcement 4, and fixed onto the inner side surface, in the vehicle-width direction, of the outer door panel 2. A mirror-support stay is disposed on the outer side, in the vehicle-width direction, of the outer door panel 2, and supports a mirror. A mirror mounting member 30 is fixed to a front end portion of the outer waist reinforcement 4 and a front end portion of the door beam 5 while straddling these two front end portions to connect the two, and supports a lower end of the mirror-support stay.

1 Claim, 5 Drawing Sheets

VEHICLE DOOR STRUCTURE

TECHNICAL FIELD

The present invention relates to a vehicle door structure.

BACKGROUND ART

It is known that a vehicle door such as one for a cab-over truck may have a structure in which a mirror-support stay for supporting a mirror is supported at its lower end by a lower bracket fixed to an outer door panel.

Patent Document 1: JP-A 7-251676

DISCLOSURE OF THE INVENTION

Problems to be Solved by the Invention

In that structure, since the lower end of the mirror-support stay is supported by only the outer door panel, a sufficient mounting rigidity is not obtained. Accordingly, the mirror vibrates upon receipt of a vibration force from an engine or from a road surface on which the vehicle is running. This vibration of the mirror may reduce durability thereof.

Therefore, an object of the present invention is to provide a door structure capable of reliably suppressing vibration of a mirror and thus improving durability thereof.

Means for Solving the Problems

In order to achieve the above object, a door structure according to a first aspect of the present invention includes an outer door panel, an outer waist reinforcement, a door beam, a mirror-support stay, and a mirror mounting member.

The outer door panel defines at least a lower edge of a door window portion. The outer waist reinforcement is disposed along the lower edge of the door window portion on the inner side, in a vehicle-width direction, of the outer door panel, and is fixed onto the inner side surface, in the vehicle-width direction, of the outer door panel to reinforce the outer door panel. The door beam is disposed in a front-rear direction below the outer waist reinforcement, and is fixed onto the inner side surface, in the vehicle-width direction, of the outer door panel to reinforce the outer door panel. The mirror-support stay is disposed on an outer side, in the vehicle-width direction, of the outer door panel, and supports a mirror.

The mirror mounting member is fixed to a front end portion of the outer waist reinforcement and to a front end portion of the door beam while straddling these two front end portions to connect the two, and supports a lower end of the mirror-support stay.

In this configuration, the mirror-support stay is supported by the mirror mounting member which is fixed to, while straddling, the outer waist reinforcement and the door beam for reinforcing the outer door panel. Thereby, the mounting rigidity of the mirror is ensured, and the vibration of the mirror is reliably suppressed, improving the durability.

A door structure according to a second aspect of the present invention is the door structure according to the first aspect further including an inner door panel and a hinge reinforcement. The inner door panel includes: a side plate portion disposed on an inner side, in the vehicle-width direction, of the outer door panel so as to face the outer door panel; and a front plate portion extending curved from a front edge of the side plate portion to be joined to the outer door panel, and being rotatably connected to a vehicle body. The inner door panel, together with the outer door panel, defines a closed space in between. The hinge reinforcement is fixed, within the closed space, to the front plate portion of the inner door panel to reinforce the inner door panel.

The outer waist reinforcement and the door beam are disposed in the closed space. The mirror mounting member is fixed to the front plate portion of the inner door panel and to the hinge reinforcement.

In this configuration, the mirror mounting member is fixed not only to the outer waist reinforcement and the door beam, but also to the inner door panel and the hinge reinforcement. Thereby, the mounting rigidity of the mirror is further improved.

Moreover, the front plate portion of the inner door panel and the hinge reinforcement are connected to the outer waist reinforcement and the door beam via the mirror mounting member. Thereby, the mounting rigidity of the door on the vehicle body side is improved.

Effects of the Invention

According to the present invention, the vibration of a mirror is reliably suppressed and the durability is improved.

Figure 1:
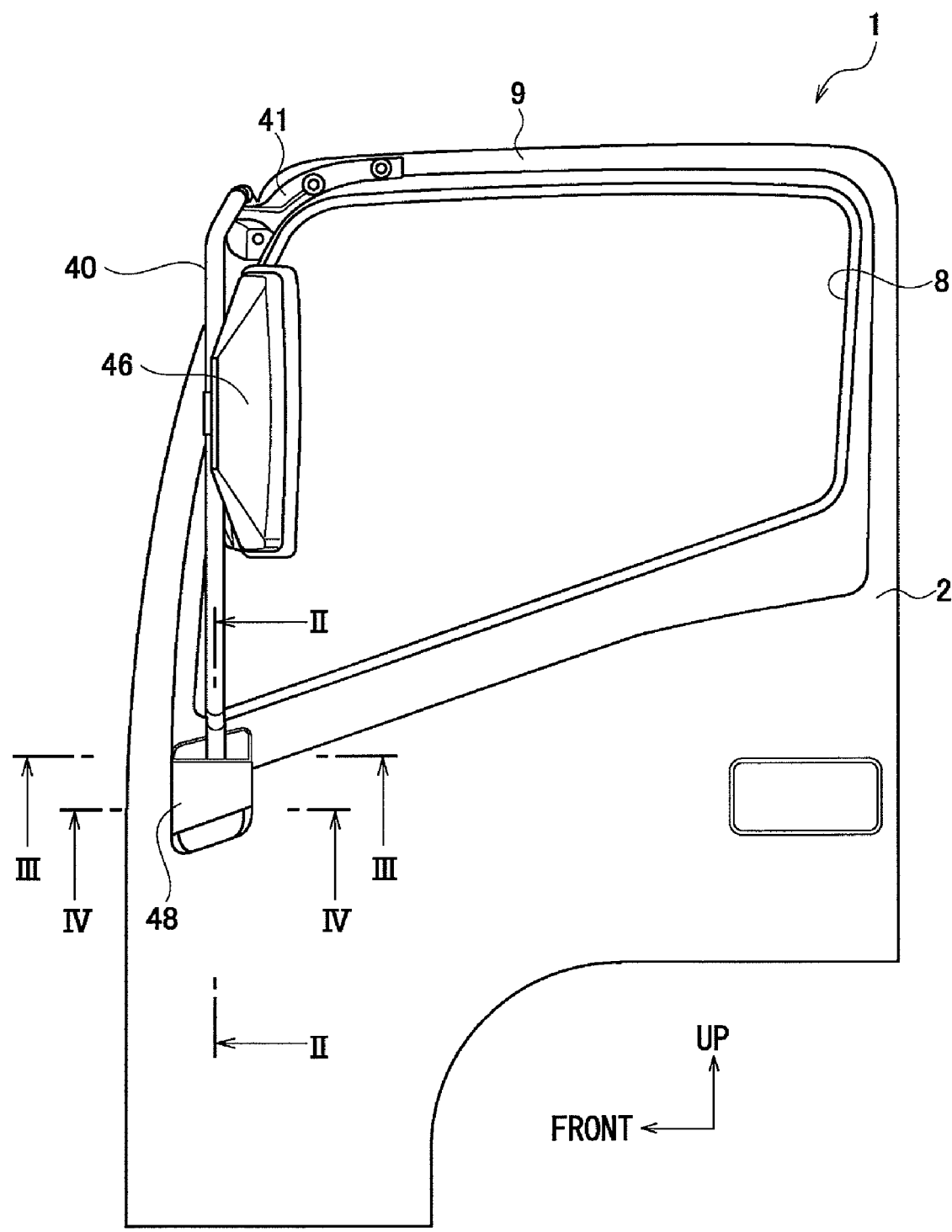
FIG. 1 is a side view of a vehicle door according to a present embodiment as viewed from the outer side in a vehicle-width direction.

DESCRIPTION OF SYMBOLS 1 door (side door)
2 outer door panel
3 inner door panel
4 outer waist reinforcement
5 door beam
6 hinge reinforcement
7 closed space
8 door window portion
10 side plate portion of inner door panel
11 front plate portion of inner door panel
30 mirror mounting member
40 mirror-support stay
46 mirror (door mirror)

BEST MODES FOR CARRYING OUT THE INVENTION

Figure 2:
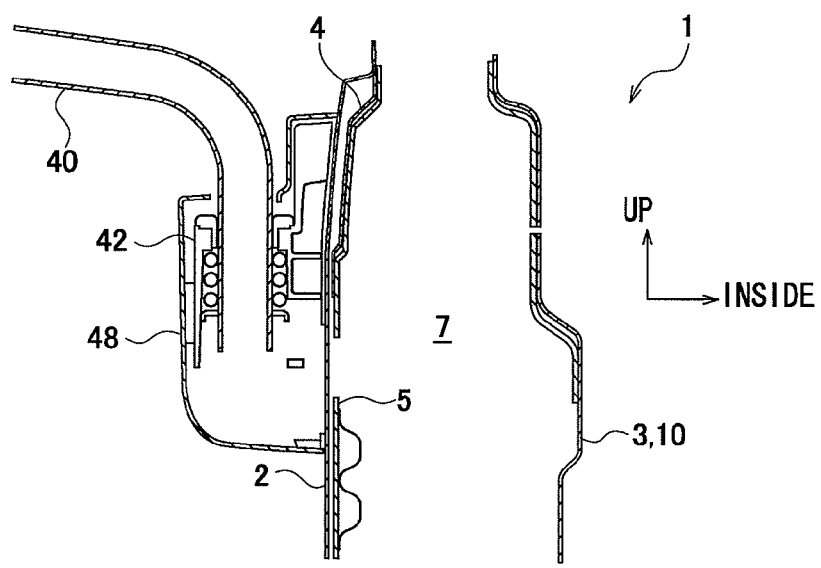
FIG. 2 is a cross-sectional view as viewed from the II-II arrow direction in FIG. 1.
Figure 3:
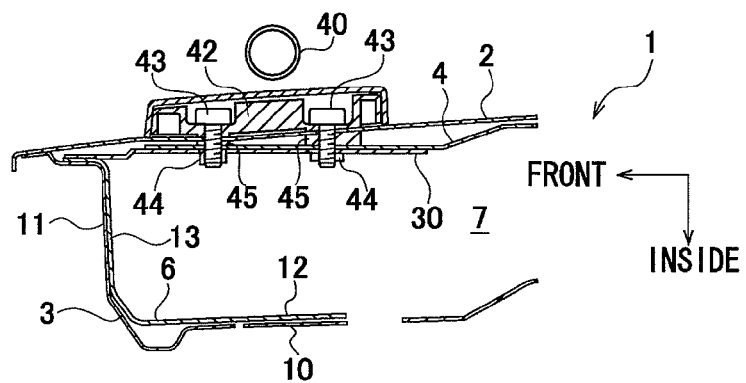
FIG. 3 is a cross-sectional view as viewed from the III-III arrow direction in FIG. 1.
Figure 4:
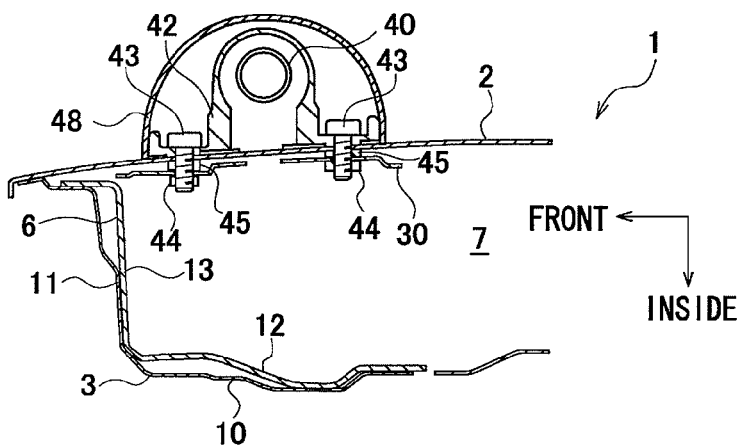
FIG. 4 is a cross-sectional view as viewed from the IV-IV arrow direction in FIG. 1.
Figure 5:
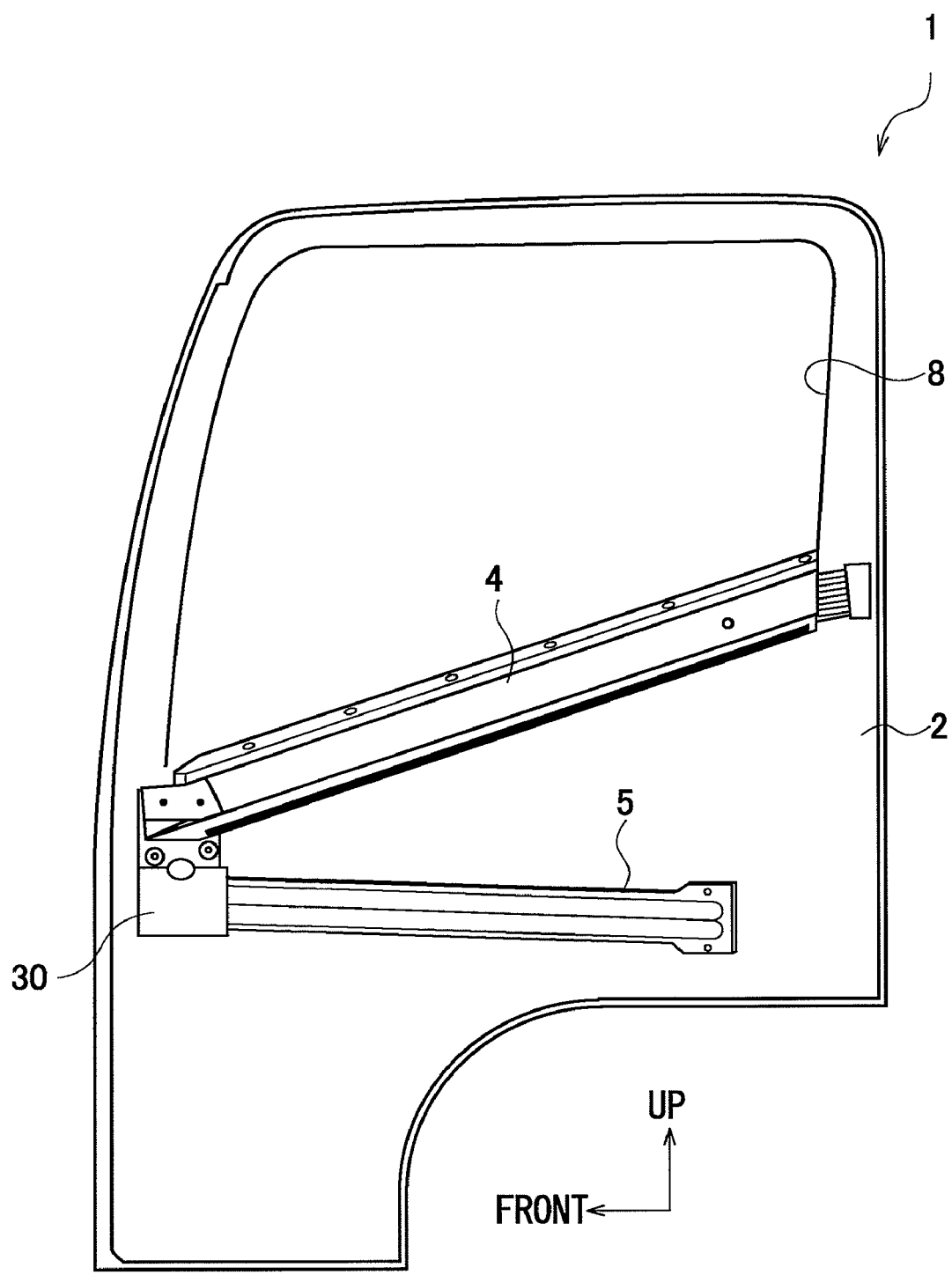
FIG. 5 is a side view of the vehicle door according to the present embodiment as viewed from the inner side in the vehicle-width direction.
Figure 6:
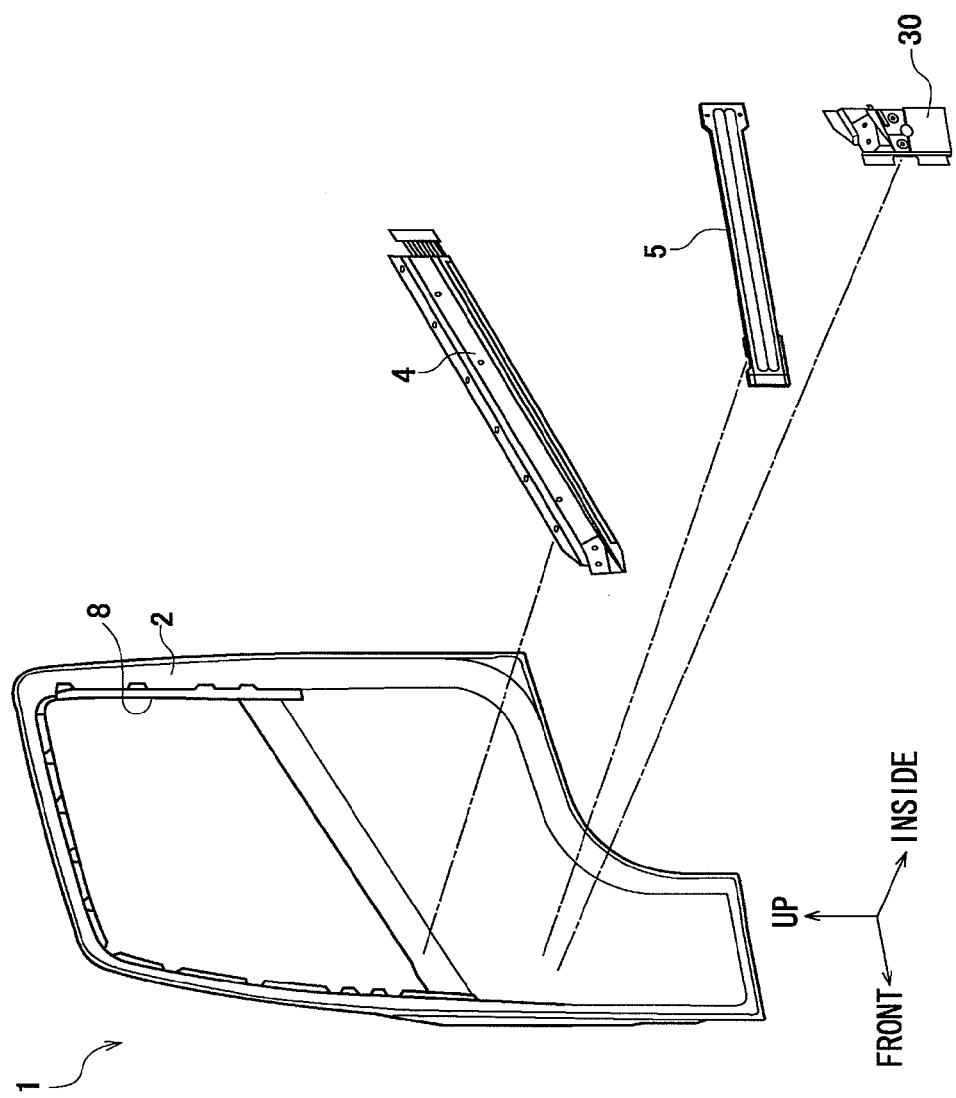
FIG. 6 is an exploded perspective view of the door in FIG. 5 as viewed from the inner side in the vehicle-width direction.
Figure 7:
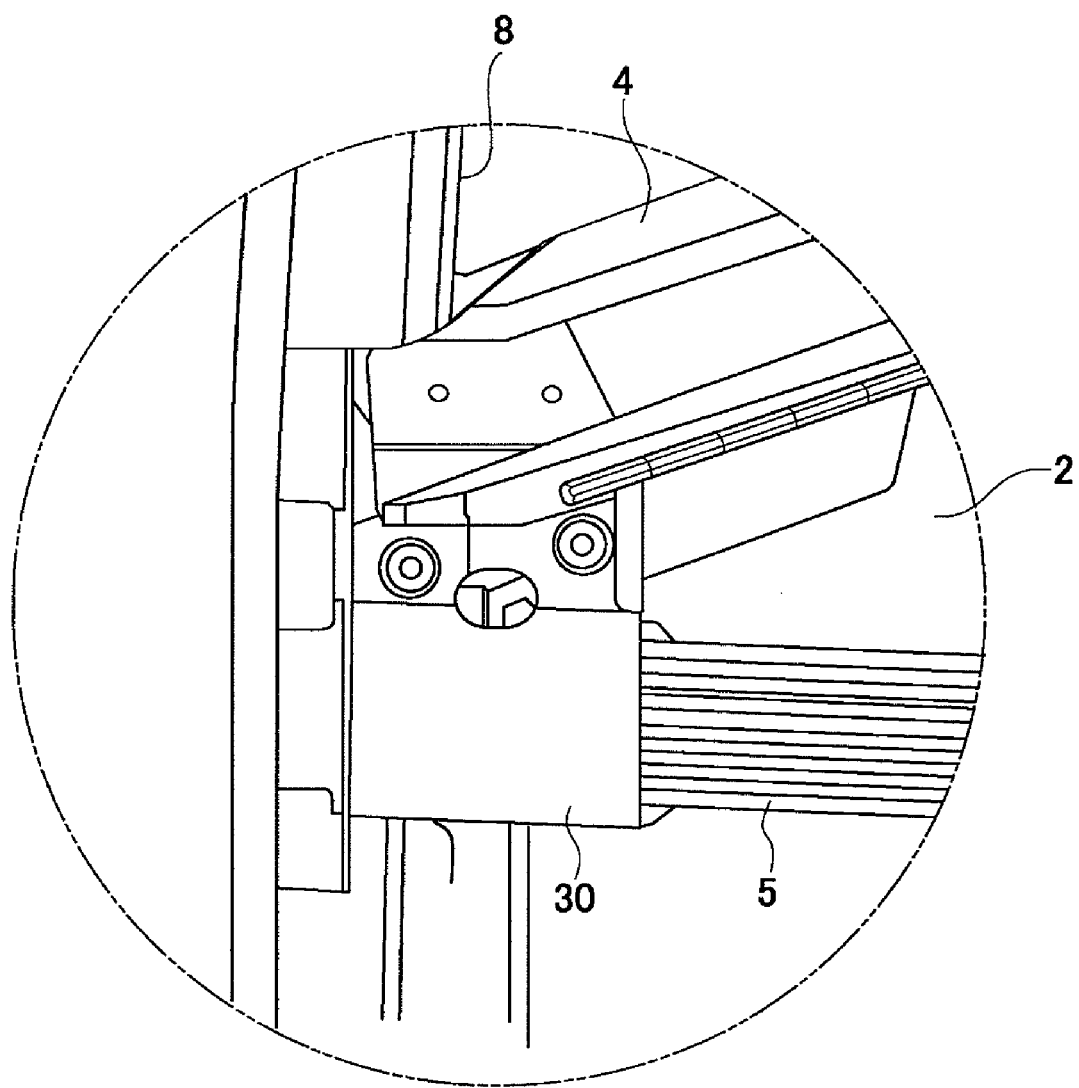
FIG. 7 is an enlarged view of a chief part in FIG. 5.

Hereinafter, one embodiment of the present invention will be described with reference to the drawings. FIG. 1 is a side view of a vehicle door according to the present embodiment as viewed from the outer side in a vehicle-width direction. FIG. 2 is a cross-sectional view as viewed from the II-II arrow direction in FIG. 1. FIG. 3 is a cross-sectional view as viewed from the III-III arrow direction in FIG. 1. FIG. 4 is a cross-sectional view as viewed from the IV-IV arrow direction in FIG. 1. FIG. 5 is a side view of the vehicle door according to the present embodiment as viewed from the inner side in the vehicle-width direction. FIG. 6 is an exploded perspective view of the door in FIG. 5 as viewed from the inner side in the vehicle-width direction. FIG. 7 is an enlarged view of a chief part in FIG. 5. Note that, in the drawings, "FRONT" indicates the front side of the vehicle, "UP" indicates the upper side of the vehicle, and "INSIDE" indicate the inner side in the vehicle-width direction. Additionally, in the following description, the outer side and the inner side in the vehicle-width direction mean the outer side and the inner side in the vehicle-width direction at the time the door is being closed. Right and left mean right and left at the time one in the vehicle faces the front side. Moreover, each of FIG. 1 to FIG. 4 shows a door on the left side, and each of FIG. 5 to FIG. 7 shows a door on the right side. Since these two doors have substantially symmetrical structures, each pair of components will be denoted by the same symbol in the following description. Furthermore, in FIG. 5 and FIG. 6, an inner door panel is omitted.

As shown in FIG. 1 to FIG. 7, a door (side door) 1 for opening and closing a vehicle compartment includes an outer door panel 2, an inner door panel 3, an outer waist reinforcement 4, a door beam 5, a hinge reinforcement 6, a mirror mounting member 30, and a mirror-support stay 40.

The outer door panel 2 forms the outer surface of the door 1. The inner door panel 3 includes: a side plate portion 10 which is disposed on the inner side, in the vehicle-width direction, of the outer door panel 2 so as to face the outer door panel 2; and a front plate portion 11 which extends curved from the front edge of the side plate portion 10 toward the outer side in the vehicle-width direction. A front end portion (top end portion of the outer end in the vehicle-width direction) of the front plate portion 11 bends frontward, and is joined to a front end portion of the outer door panel 2. Thereby, a closed space 7 is defined by the outer door panel 2 and the inner door panel 3. The front plate portion 11 is rotatably connected to the vehicle body by a hinge mechanism (unillustrated). The outer door panel 2 and the inner door panel 3 define a lower edge of a door window portion 8, which inclines upwardly to the rear.

The hinge reinforcement 6 includes a rear portion 12 and a front portion 13, and is disposed in the closed space 7. The rear portion 12 of the hinge reinforcement 6 is disposed along the outer-side surface, in the vehicle-width direction, of the side plate portion 10 of the inner door panel 3 (the surface defining the closed space 7). The rear portion 12 is joined to the side plate portion 10. The front portion 13 extends curved outwardly in the vehicle-width direction from the front edge of the rear portion 12 along the front plate portion 11 of the inner door panel 3. The front portion 13 is joined to the front plate portion 11. Note that the front end portion of the front plate portion 11 of the inner door panel 3, a front end portion of the front portion 13 of the hinge reinforcement 6, and a front end portion of the mirror mounting member 30 are joined to each other in an overlapping manner. Thereby, the hinge reinforcement 6 reinforces mainly the front plate portion 11 of the inner door panel 3, to which loads are applied at the time of opening and closing the door 1.

The outer waist reinforcement 4 has a substantially long-platy shape, and is disposed along the lower edge of the door window portion 8 on the inner side, in the vehicle-width direction, of the outer door panel 2 (in the closed space 7). The outer waist reinforcement 4 is joined to the inner side surface, in the vehicle-width direction, of the outer door panel 2 (the surface defining the closed space 7), and reinforces mainly the outer door panel 2 in the vicinity of the lower edge of the door window portion 8.

The door beam 5 has a substantially long-platy shape, and is disposed in a front-rear direction below the outer waist reinforcement 4 in the closed space 7. The door beam 5 is joined to the inner side surface, in the vehicle-width direction, of the outer door panel 2 (the surface defining the closed space 7), and reinforces a middle portion of the outer door panel 2. Moreover, the door beam 5 has a function to absorb a shock at the time the door 1 is deformed upon a vehicle collision, and also has a function to set a deformation mode of the door 1 so as to allow the deformed door 1 to be opened. Because the outer waist reinforcement 4 inclines upwardly toward the rear, the outer waist reinforcement 4 and the door beam 5 come closest to each other at their front end portions.

The mirror mounting member 30 has a substantially platy shape, and is fixed to the front end portion of the outer waist reinforcement 4 and to the front end portion of the door beam 5 while straddling these two front end portions to connect the two. Moreover, as described above, the front end portion of the mirror mounting member 30 overlaps the front end portion of the front plate portion 11 of the inner door panel 3 and the front end portion of the front portion 13 of the hinge reinforcement 6, and is joined to them. Furthermore, four weld nuts 44 are joined respectively at four predetermined positions—upper front position, upper rear position, lower front position, and lower rear position—on the inner side surface, in the vehicle-width direction, of the mirror mounting member 30. The weld nut 44 is for screwing a bolt 43 to fasten and fix a lower support member 42 to be described later.

The mirror-support stay 40 is substantially rod-shaped extending vertically. The mirror-support stay 40 is disposed on the outer side, in the vehicle-width direction, of an upper front portion of the outer door panel 2. A mirror (door mirror) 46 is fixed to a middle portion of the mirror-support stay 40. An upper end portion of the mirror-support stay 40 is rotatably supported by an upper support member 41 that is fixed to an upper front corner portion of a sash portion 9 of the outer door panel 2. A lower end portion of the mirror-support stay 40 is rotatably supported by the lower support member 42 that is disposed on the outer-side surface in the vehicle-width direction below a lower front corner portion of the door window portion 8 of the outer door panel 2. The lower support member 42 is fastened and fixed onto the outer-side surface, in the vehicle-width direction, of the outer door panel 2 by screwing, into the weld nuts 44, the upper two bolts 43 penetrating the outer door panel 2, the outer waist reinforcement 4 and the mirror mounting member 30 as shown in FIG. 3, and by screwing, into the weld nuts 44, the lower two bolts 43 penetrating the outer door panel 2 and the mirror mounting member 30 as shown in FIG. 4. Note that spacers 45 are provided between the outer door panel 2 and the outer waist reinforcement 4 at the upper fastened portions, and between the outer door panel 2 and the mirror mounting member 30 at the lower fastened portions, respectively. Moreover, the lower support member 42 is covered by a cover 48.

According to the present embodiment, the lower end portion of the mirror-support stay 40 is supported by the mirror mounting member 30 which is fixed to, while straddling, the outer waist reinforcement 4 and the door beam 5 for reinforcing the outer door panel 2. Thereby, the mounting rigidity of the mirror 46 is ensured, and the vibration of the mirror 46 is reliably suppressed, improving the durability.

Moreover, the mirror mounting member 30 is fixed not only to the outer waist reinforcement 4 and the door beam 5, but also to the inner door panel 3 and the hinge reinforcement 6. Thereby, the mounting rigidity of the mirror 46 is further improved.

Furthermore, the front plate portion 11 of the inner door panel 3 and the hinge reinforcement 6 are connected to the outer waist reinforcement 4 and the door beam 5 via the mirror mounting member 30. Thereby, the mounting rigidity of the door 1 on the vehicle body side is improved.

Hereinabove, the description has been give of the embodiment to which the invention made by the present inventors are applied. However, the present invention is not limited by the description and the drawings constituting parts of the disclosure of the present invention in way of this embodiment. To put it differently, it goes without saying that other embodiments, examples, operation technologies, and the like made by those skilled in the art or others on the basis of this embodiment are all included in the scope of the present invention.

Industrial Applicability

A door structure according to the present invention is suitably used in various vehicles.

The invention claimed is:

1. A vehicle door structure comprising:
    an outer door panel which defines at least a lower edge of a door window portion;
    an outer waist reinforcement which is disposed along the lower edge of the door window portion on an inner side, in a vehicle-width direction, of the outer door panel, and which is fixed onto an inner side surface, in the vehicle-width direction of the outer door panel to reinforce the outer door panel;
    a door beam which is disposed in a front-rear direction below the outer waist reinforcement, and which is fixed onto the inner side surface, in the vehicle-width direction, of the outer door panel to reinforce the outer door panel;
    a mirror-support stay which is disposed on an outer side, in the vehicle-width direction, of the outer door panel, and which supports a mirror;
    a mirror mounting member which is fixed to a front end portion of the outer waist reinforcement and to a front end portion of the door beam while straddling the two front end portions to connect the two front end portions, and which supports a lower end of the mirror-support stay; and
    an inner door panel which, together with the outer door panel, defines a closed space in between, the inner door panel including:
    a side plate portion disposed on an inner side, in the vehicle-width direction, of the outer door panel so as to face the outer door panel;
    a front plate portion extending curved from a front edge of the side plate portion to be joined to the outer door panel, and being rotatably connected to a vehicle body; and
    a hinge reinforcement which is fixed, within the closed space, to the front plate portion of the inner door panel to reinforce the inner door panel, wherein
    the outer waist reinforcement and the door beam are disposed in the closed space, and
    the mirror mounting member is fixed to the front plate portion of the inner door panel and to the hinge reinforcement.

* * * * *